Patented Jan. 24, 1950

2,495,278

UNITED STATES PATENT OFFICE 2,495,278

DEHYDROGENATION OF ALKYL AROMATIC COMPOUNDS

Joseph E. Nickels, Pittsburgh, Pa., assignor to Koppers Company, Inc., Pittsburgh, Pa., a corporation of Delaware No Drawing. Application April 12, 1946, Serial No. 661,871

4 Claims. (Cl. 260—669)

This invention relates to the catalytic dehydrogenation of alkyl aromatic hydrocarbons. More particularly the invention relates to a bauxite catalyst for dehydrogenating alkyl aromatic hydrocarbons, such as ethylbenzene.

In the catalytic dehydrogenation of aromatic hydrocarbons some carbon is always formed which results in the loss of aromatic compound being dehydrogenated. This carbon may be deposited on the catalyst or may be used up in the formation of carbon-oxygen gases such as carbon monoxide or carbon dioxide. The most desirable catalyst is one which will produce the least amount of carbon while giving high selectivity in its operation and high activity.

The dehydrogenation reaction must be carried out at a comparatively high temperature, 500° to 700° C., preferably about 650° C., therefore a short contact time through the catalyst bed must be maintained to hold down the conversion per pass through the bed to about 25 to 40% by weight of the aromatic compound charged to hold down the carbon formation. The carbon usually deposits in the catalyst bed and these deposits decrease the catalyst activity. Further the presence of carbon on the catalyst acts to accelerate more carbon formation.

The primary object of the present invention is to provide a catalyst for dehydrogenation of alkyl aromatic compounds which will promote a minimum formation of carbon.

Another object of the invention is to provide a catalyst which will dispose of the carbon as formed to prevent the carbon from fouling or poisoning the catalyst.

A further object of the invention is to provide a process of catalytically dehydrogenating aromatic compounds in the presence of steam to promote the activity and selectivity of the catalyst.

A still further object of the invention is to provide a process by which alkyl aromatic compounds may be catalytically dehydrogenated and at the same time regenerating the catalyst activity by the reaction.

With these and other objects in view the invention consists in the improved process of dehydrogenating alkyl aromatic compounds and the catalyst therefor which is hereinafter described and particularly defined in the claims.

An important application of the present process resides in the dehydrogenation of alkyl benzene; such as ethylbenzene, for the production of styrene. The process is also applicable to the dehydrogenation of ethylnaphthalene to produce vinylnaphthalene. In fact tests have shown that the process is applicable to the dehydrogenation of all alkyl aromatic compounds in which the alkyl group contains two or more carbon atoms.

The preferred process consists in vaporizing the alkyl aromatic compound and mixing it with steam in the molar ratio of one part of alkyl aromatic to ten parts of steam and passing the vapor mixture through a catalyst bed which is made up of bauxite containing an alkaline metal carbonate or oxide. The reaction is carried out at atmospheric pressure and a temperature of 500° to 700° C. In the dehydrogenation of ethylbenzene, it has been found that 650° C. produces the most economic conversion. The vapor mixture is passed through the catalyst bed with a contact time of 0.5 second. These conditions effect a dehydrogenation conversion between 25 and 40% of the ethylbenzene per pass through the catalyst. The unreacted ethylbenzene is separated from the reaction products and recycled so that the ultimate production of styrene from ethylbenzene varies from 70% to 85% by weight of the ethylbenzene charged.

The dehydrogenation catalyst forms an important feature of the present invention. Bauxite is the base material and preferably a low iron bauxite is utilized. With the bauxite is added a minor proportion of an alkali metal carbonate or an alkaline-earth metal carbonate. These carbonates when exposed to the high temperatures of the reaction are converted to oxides so that the catalyst being used is composed of bauxite having an alkaline metal oxide distributed thereon. The alkaline metal carbonates or oxides used as modifiers may be potassium, sodium, lithium, rubidium, cesium, barium, or strontium. All of these alkaline metal oxide modifiers have been found to be effective as dehydrogenation catalysts. The potassium oxide, however, appears to be the most active and selective of the metals which have been tested.

In Table I is outlined data of tests on the dehydrogenation of ethylbenzene with a modified bauxite catalyst.

TABLE I

*Dehydrogenation of ethylbenzene with bauxite*
*Low iron bauxite impregnated with alkali carbonates*

| Catalyst | Low Iron Bauxite | 10% Li₂CO₃ on Bauxite | 10% Na₂CO₃ on Bauxite | 10% K₂CO₃ on Bauxite | 8% Rb₂CO₃ on Bauxite | 10% Cs₂CO₃ on Bauxite |
|---|---|---|---|---|---|---|
| EXPERIMENTAL CONDITIONS | | | | | | |
| Length of run, hours | 164 | 164 | 164 | 164 | 164 | 164 |
| Molar ratio (H₂O) | 10:1 | 10:1 | 10:1 | 10:1 | 10:1 | 10:1 |
| Contact time, sec | 0.51 | 0.51 | 0.52 | 0.52 | 0.51 | 0.51 |
| Catalyst temp., °C | 650 | 650 | 650 | 650 | 650 | 650 |
| PRODUCT DISTRIBUTION, WT. PER CENT | | | | | | |
| Gases | 2.1 | 1.9 | 1.8 | 1.6 | 1.9 | 2.0 |
| Benzene | 2.3 | 2.4 | 1.9 | 1.4 | 2.1 | 2.2 |
| Toluene | 2.8 | 3.4 | 3.0 | 3.1 | 2.2 | 2.4 |
| Ethylbenzene | 67.7 | 64.2 | 63.0 | 64.4 | 67.0 | 66.5 |
| Styrene | 23.8 | 26.3 | 28.8 | 28.3 | 25.3 | 25.5 |
| Residue | 0.9 | 1.4 | 1.0 | 0.8 | 1.0 | 1.0 |
| Carbon [1] | 0.4 | 0.4 | 0.5 | 0.4 | 0.5 | 0.4 |
| STYRENE YIELDS, WT. PER CENT | | | | | | |
| Ultimate | 72.4 | 72.7 | 77.1 | 78.7 | 75.6 | 75.6 |
| Per pass | 23.8 | 26.3 | 28.8 | 28.3 | 25.3 | 25.5 |

[1] Carbon as CO₂ and CO plus carbon on catalyst.

In Table II is shown the data relating to the same tests as the tests of Table I wherein the activity of the catalyst during different periods of the run is emphasized, this table thus showing that during the beginning of the run the catalyst does not reach its full activity until about twenty-four hours of operation. With most of the catalysts the activity is greatest after about ninety-six hours operation and thereafter the activity tends to slowly fall off. With a rubidium oxide catalyst there is practically no induction period because its activity starts immediately and thereafter gradually decreases.

TABLE II

*Variation of styrene yields with duration of run*

| Catalyst | Low Iron Bauxite | 10% Li₂CO₃ | 10% Na₂CO₃ | 10% K₂CO₃ | 8% Rb₂CO₃ | 10% Cs₂CO₃ |
|---|---|---|---|---|---|---|
| ULTIMATE YIELD, WT. PER CENT | | | | | | |
| 0-24 hours | 76.7 | 73.4 | 70.1 | 74.1 | 81.7 | 75.7 |
| 0-48 hours | 78.1 | 76.4 | 75.5 | 78.8 | 81.5 | 77.7 |
| 0-96 hours | 75.2 | 75.8 | 78.3 | 80.5 | 78.8 | 77.6 |
| 0-164 hours | 72.4 | 72.8 | 77.1 | 78.7 | 75.6 | 75.6 |
| STYRENE YIELD PER PASS, WT. PER CENT | | | | | | |
| 0-24 hours | 39.9 | 28.0 | 19.2 | 19.4 | 37.2 | 24.2 |
| 0-48 hours | 35.1 | 31.3 | 28.8 | 27.1 | 33.7 | 30.3 |
| 0-96 hours | 28.0 | 29.8 | 31.8 | 32.0 | 30.1 | 28.8 |
| 0-164 hours | 25.8 | 26.3 | 28.8 | 28.3 | 25.3 | 25.5 |

From Table I it will be seen that the amount of carbon deposited on the catalyst is approximately 0.4% by weight of the alkyl aromatic compound charged to the process during 164 hours of operation.

A commercial process of producing styrene from ethylbenzene utilizes a catalyst known as "1707" which is composed principally of magnesium oxide with a small amount of modifier for carrying out the dehydrogenation reaction. In this commercial operation tests have shown that approximately 4.4% of the ethylbenzene is converted to carbon during 32 hours of operation, when utilizing a temperature of 650° C. and operating with a molar ratio of ethylbenzene to water of 1:10, and using a time of contact of the vapors with the catalyst of 0.5 second. Of the 4.4% carbon 2.3% is deposited on the catalyst and 2.1% of carbon is removed from the system in the form of carbon-oxygen gases, i. e. carbon monoxide and carbon dioxide.

A comparative test using applicant's catalyst composed of bauxite 90%, and sodium carbonate 10% when dehydrogenating ethylbenzene and steam in the molar ratio of 1:10 for 32 hours at 650° C. with a time of contact of 0.5 second, 4.16% by weight of carbon was deposited on the catalyst. This 4.16% by weight of carbon was deposited on the catalyst in a run of 32 hours and other carbon was removed from the system in the form of carbon-oxygen gases, that is carbon monoxide and carbon dioxide. The 1707 catalyst has a slightly higher activity in that it gives an ultimate conversion of between 85% and 90% of the ethylbenzene to styrene. However approximately seven times as much carbon is deposited on the 1707 catalyst as is deposited on the bauxite catalyst. Therefore the life of the bauxite catalyst is very much longer than the life of the 1707 catalyst. Furthermore, the bauxite catalyst is practically as selective as 1707. The bauxite catalyst of the present invention is much cheaper than synthetic catalysts of the type of 1707 and the alumina-silica catalysts.

The presence of the alkali metal oxide with the bauxite at a temperature of 650° C. acts to promote a water gas reaction whereby the steam present with the ethylbenzene is broken down into oxygen and hydrogen, and carbon, which may be formed by the dehydrogenation reaction is immediately oxidized to carbon monoxide or carbon dioxide. These carbon-oxygen gases pass through the catalyst converter and may be readily separated from the products of reaction. A comparative test was run with the bauxite alone as a catalyst in the dehydrogenation of ethylbenzene and a catalyst formed in accordance with the present invention wherein 10% of sodium carbonate was applied to the bauxite. These tests show the effect of the modifier, particularly with reference to the amount of carbon deposited on the catalyst.

TABLE III

*Comparison of low iron bauxite and 10% $Na_2CO_3$ on bauxite as catalysts for ethylbenene dehydrogenation*

| Catalyst | 10% $Na_2CO_3$ Bauxite | Low Iron Bauxite |
|---|---|---|
| EXPERIMENTAL CONDITIONS | | |
| Length of run, hrs | 32 | 32 |
| Molar ratio ($H_2O$) | 10:1 | 10:1 |
| Contact time, sec | 0.5 | 0.5 |
| Catalyst temp., °C | 650 | 650 |
| PRODUCT DISTRIBUTION, WT. PER CENT | | |
| Gases | 1.4 | 1.8 |
| Benzene | 2.0 | 2.6 |
| Toluene | 2.9 | 3.0 |
| Ethylbenzene | 67.3 | 51.2 |
| Styrene | 25.6 | 39.1 |
| Residue | 0.5 | 0.9 |
| Carbon [1] | 0.3 | 1.4 |
| COMPOSITION OF GASES, VOL. PER CENT | | |
| Hydrogen | 83.4 | 90.0 |
| Ethylene | 7.4 | 4.3 |
| Paraffins | 9.2 | 5.7 |
| Paraffin index | 1.1 | 1.2 |
| STYRENE YIELDS, WT. PER CENT | | |
| Ultimate | 77.2 | 79.4 |
| Per Pass | 25.6 | 39.1 |
| Regenerative Ratio (C as gas/C on Cat.) | 0.49 | 0.22 |

[1] Carbon as $CO_2$ and CO plus carbon on catalyst.

From Table II it will be seen that the modifier on the bauxite not only increases the activity of the catalyst to give a higher conversion per pass, but also increases the ultimate styrene yield.

It has been found that from 5% to 10% of alkali metal carbonate or oxide for modifying the action of bauxite gives very favorable results.

The preferred form of the invention having been thus described what is claimed as new is:

1. A process of dehydrogenating alkyl aromatic hydrocarbons in which the alkyl group contains two or more carbon atoms comprising: vaporizing the aromatic hydrocarbon, mixing the vapors with a large excess of steam and passing the steam-vapor mixture through a catalyst composed essentially of bauxite having a minor proportion of alkali metal carbonate distributed therein at a temperature of 500° to 700° C.

2. The process defined in claim 1 in which the catalyst is composed of approximately 90% to 95% bauxite and 10% to 5% potassium carbonate.

3. The process defined in claim 1 in which the molar ratio of water to alkyl aromatic hydrocarbon is approximately 10:1.

4. The process defined in claim 1 in which the alkyl aromatic hydrocarbon is ethylbenzene, and the mixture of ethylbenzene vapor and steam is held in the catalyst bed for approximately 0.5 second.

JOSEPH E. NICKELS.

REFERENCES CITED

The following references are of record in the file of this patent:

UNITED STATES PATENTS

| Number | Name | Date |
|---|---|---|
| 1,986,241 | Wulff et al. | Jan. 1, 1935 |
| 1,986,557 | Connolly et al. | Jan. 1, 1935 |
| 2,098,959 | Frey et al. | Nov. 16, 1937 |
| 2,110,833 | Mark et al. | Mar. 8, 1938 |
| 2,300,971 | Roberts et al. | Nov. 3, 1942 |
| 2,380,876 | Schulze et al. | July 31, 1945 |
| 2,395,875 | Kearby | Mar. 5, 1946 |
| 2,408,139 | Gutzeit | Sept. 24, 1946 |